(12) United States Patent
Roberts

(10) Patent No.: US 8,294,075 B2
(45) Date of Patent: *Oct. 23, 2012

(54) SOLID STATE LUMINAIRES FOR GENERAL ILLUMINATION

(75) Inventor: John K. Roberts, Grand Rapids, MI (US)

(73) Assignee: Cree, Inc., Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 12/851,026

(22) Filed: Aug. 5, 2010

(65) Prior Publication Data

US 2010/0294913 A1 Nov. 25, 2010

Related U.S. Application Data

(63) Continuation of application No. 11/408,648, filed on Apr. 21, 2006, now Pat. No. 7,777,166.

(51) Int. Cl.
*G01J 1/32* (2006.01)

(52) U.S. Cl. ......... 250/205; 362/231; 362/612; 362/561

(58) Field of Classification Search .............. 250/205, 250/214 AL; 315/149–159, 291, 224, 307, 315/316, 312; 362/612, 555, 231, 230, 97, 362/561

See application file for complete search history.

(56) References Cited

U.S. PATENT DOCUMENTS

| | | |
|---|---|---|
| 3,805,937 A | 4/1974 | Hatanaka et al. |
| 3,927,290 A | 12/1975 | Denley |
| 4,325,146 A | 4/1982 | Lennington |
| 4,408,157 A | 10/1983 | Beaubien |
| 4,420,398 A | 12/1983 | Castino |
| 5,087,883 A | 2/1992 | Hoffman |
| 5,264,997 A | 11/1993 | Hutchisson et al. |
| 5,407,799 A | 4/1995 | Studier |
| 5,410,519 A | 4/1995 | Hall et al. |

(Continued)

FOREIGN PATENT DOCUMENTS

EP 1 081 771 3/2001

(Continued)

OTHER PUBLICATIONS

Takato, Japanese Publication No. 2002-072901, Machine English translation.*

(Continued)

*Primary Examiner* — Francis M Legasse, Jr.

(74) *Attorney, Agent, or Firm* — Myers Bigel Sibley & Sajovec

(57) ABSTRACT

A lighting panel includes a tile having a first side parallel to a principal plane of the lighting panel, a plurality of solid state lighting devices arranged on the first side of the tile and configured to emit light, a reflector sheet on the first side of the tile, and a brightness enhancement film on the reflector sheet. The reflector sheet may be arranged between the tile and the brightness enhancement film and the brightness enhancement film may be configured to increase the on-axis intensity of emitted light. A luminaire adapted for general illumination includes a lighting panel as described above, a current supply circuit configured to supply an on-state drive current to a string of lighting devices in response to a control signal, a photosensor arranged to receive light from one of the solid state lighting devices, and a control system configured to receive an output signal from the photosensor and to adjust the control signal responsive to the output signal of the photosensor.

33 Claims, 11 Drawing Sheets

U.S. PATENT DOCUMENTS

| | | | |
|---|---|---|---|
| 5,563,849 | A | 10/1996 | Hall et al. |
| 5,820,253 | A | 10/1998 | Scholz |
| 5,924,785 | A | 7/1999 | Zhang et al. |
| 6,095,666 | A | 8/2000 | Salam |
| 6,292,901 | B1 | 9/2001 | Lys et al. |
| 6,335,538 | B1 | 1/2002 | Prutchi et al. |
| 6,348,766 | B1 | 2/2002 | Ohishi et al. |
| 6,357,889 | B1 | 3/2002 | Duggal et al. |
| 6,394,621 | B1 | 5/2002 | Hanewinkel, III |
| 6,578,998 | B2 | 6/2003 | Zhang |
| 6,624,350 | B2 | 9/2003 | Nixon et al. |
| 6,760,157 | B1 * | 7/2004 | Allen et al. ............ 359/494 |
| 6,791,257 | B1 | 9/2004 | Sato et al. |
| 6,799,864 | B2 * | 10/2004 | Bohler et al. .......... 362/236 |
| 6,857,767 | B2 | 2/2005 | Matsui et al. |
| 6,871,982 | B2 * | 3/2005 | Holman et al. ......... 362/331 |
| 6,880,954 | B2 | 4/2005 | Ollett et al. |
| 7,001,047 | B2 | 2/2006 | Holder et al. |
| 7,093,958 | B2 | 8/2006 | Coushaine |
| 7,131,760 | B2 | 11/2006 | Mayer et al. |
| 7,178,941 | B2 | 2/2007 | Roberge et al. |
| 7,213,940 | B1 | 5/2007 | Van De Ven et al. |
| 7,244,058 | B2 | 7/2007 | DiPenti et al. |
| 7,246,921 | B2 | 7/2007 | Jacobson et al. |
| 7,276,861 | B1 | 10/2007 | Shteynberg et al. ..... 315/291 |
| 7,355,284 | B2 | 4/2008 | Negley |
| 7,374,311 | B2 | 5/2008 | Rains, Jr. et al. |
| 2002/0006350 | A1 | 1/2002 | Nishida et al. |
| 2002/0087532 | A1 | 7/2002 | Barritz et al. |
| 2003/0034985 | A1 | 2/2003 | Needham Riddle et al. . 345/589 |
| 2003/0117798 | A1 | 6/2003 | Leysath |
| 2004/0090794 | A1 | 5/2004 | Ollett et al. |
| 2004/0096666 | A1 | 5/2004 | Knox et al. |
| 2004/0212998 | A1 | 10/2004 | Mohacsi |
| 2004/0218390 | A1 * | 11/2004 | Holman et al. ......... 362/245 |
| 2004/0264179 | A1 * | 12/2004 | Clark ..................... 362/125 |
| 2005/0001537 | A1 | 1/2005 | West et al. |
| 2005/0058947 | A1 | 3/2005 | Rinehart et al. |
| 2005/0058948 | A1 | 3/2005 | Freese et al. |
| 2005/0058949 | A1 | 3/2005 | Wood et al. |
| 2005/0099478 | A1 | 5/2005 | Iwase |
| 2005/0135441 | A1 | 6/2005 | Ng et al. ............... 372/29.14 |
| 2005/0161586 | A1 | 7/2005 | Rains, Jr. et al. |
| 2005/0168689 | A1 | 8/2005 | Knox |
| 2005/0237739 | A1 | 10/2005 | Lee et al. |
| 2005/0274972 | A1 | 12/2005 | Roth et al. |
| 2005/0280756 | A1 | 12/2005 | Kim et al. |
| 2006/0061869 | A1 | 3/2006 | Fadel et al. |
| 2006/0081773 | A1 | 4/2006 | Rains, Jr. et al. |
| 2006/0083023 | A1 * | 4/2006 | Ayabe et al. ........... 362/607 |
| 2006/0114422 | A1 | 6/2006 | Miyazawa et al. ...... 353/94 |
| 2006/0114569 | A1 | 6/2006 | Capaldo et al. |
| 2006/0158080 | A1 * | 7/2006 | Nakano et al. ......... 313/113 |
| 2006/0164729 | A1 | 7/2006 | Wood |
| 2006/0275714 | A1 | 12/2006 | Rinehart et al. |
| 2006/0285332 | A1 | 12/2006 | Goon et al. |
| 2007/0003868 | A1 | 1/2007 | Wood et al. |
| 2007/0008738 | A1 | 1/2007 | Han et al. |
| 2007/0014004 | A1 | 1/2007 | Wood |
| 2007/0047204 | A1 | 3/2007 | Parker et al. |
| 2007/0127098 | A1 | 6/2007 | Wood |
| 2007/0127129 | A1 | 6/2007 | Wood et al. |
| 2007/0146644 | A1 * | 6/2007 | Ma et al. ................ 353/52 |
| 2007/0188425 | A1 | 8/2007 | Saccomanno ........... 345/82 |
| 2007/0216704 | A1 | 9/2007 | Roberts et al. ......... 345/597 |
| 2007/0242441 | A1 | 10/2007 | Aldrich et al. |
| 2008/0103714 | A1 | 5/2008 | Aldrich et al. |

FOREIGN PATENT DOCUMENTS

| | | |
|---|---|---|
| EP | 1 111 966 | 6/2001 |
| EP | 1486818 A2 | 12/2004 |
| EP | 1553431 A1 | 7/2005 |
| JP | 05-100106 | 4/1993 |
| JP | 2002072901 | 3/2002 |
| JP | 2004111355 | 4/2004 |
| JP | 2004281352 | 10/2004 |
| JP | 2006040864 | 2/2006 |
| WO | WO 98/43014 | 10/1998 |
| WO | WO 00/34709 | 6/2000 |
| WO | WO2005073621 | 8/2005 |
| WO | WO2006003913 | 1/2006 |
| WO | WO 2007/026776 | 3/2007 |

OTHER PUBLICATIONS

International Search Report and Written Opinion; PCT/US2007/009362; Jun. 25, 2008.

U.S. Appl. No. 11/613,692, filed Dec. 20, 2006, Negley.

U.S. Appl. No. 11/743,754, filed May 3, 2007, Van De Ven.

U.S. Appl. No. 12/174,053, filed Jul. 16, 2008, Negley.

Narendran et al., "Solid-State Lighting: Failure Analysis of White LEDs"; Journal of Crystal Growth, 268:3-4 (Aug. 1, 2004).

European Search Report and Search Opinion (8 pages) corresponding to European Application No. 06845870.2; Dated: Nov. 6, 2008.

International Search Report and Written Opinion (12 pages) corresponding to International Application No. PCT/US06/48521; Mailing Date: Feb. 7, 2008.

International Search Report and Written Opinion (14 pages) corresponding to International Application No. PCT/US2008/070132; Mailing Date: Oct. 14, 2008.

International Search Report and Written Opinion (10 pages) corresponding to International Application No. PCT/US07/10766; Mailing Date: Sep. 24, 2008.

* cited by examiner

SOLID STATE LUMINAIRES FOR GENERAL ILLUMINATION

RELATED APPLICATIONS

This application is a continuation of U.S. patent application Ser. No. 11/408,648 filed on Apr. 21, 2006, which will issue as U.S. Pat. No. 7,777,166 on Aug. 17, 2010, the disclosure of which is incorporated herein in its entirety by reference as if set forth fully herein.

FIELD OF THE INVENTION

The present invention relates to solid state lighting, and more particularly to solid state lighting and to systems and methods for adjusting the light output of solid state lighting.

BACKGROUND

Solid state lighting arrays are used for a number of lighting applications. For example, solid state lighting panels including arrays of solid state lighting devices have been used as direct illumination sources, for example, in architectural and/or accent lighting. A solid state lighting device may include, for example, a packaged light emitting device including one or more light emitting diodes (LEDs). Inorganic LEDs typically include semiconductor layers forming p-n junctions. Organic LEDs (OLEDs), which include organic light emission layers, are another type of solid state light emitting device. Typically, a solid state light emitting device generates light through the recombination of electronic carriers, i.e. electrons and holes, in a light emitting layer or region.

Solid state lighting panels are commonly used as backlights for small liquid crystal display (LCD) display screens, such as LCD display screens used in portable electronic devices. In addition, there has been increased interest in the use of solid state lighting panels for general illumination, such as indoor lighting.

The color rendering index of a light source is an objective measure of the ability of the light generated by the source to accurately illuminate a broad range of colors. The color rendering index ranges from essentially zero for monochromatic sources to nearly 100 for incandescent sources. For large-scale backlight and illumination applications, it is often desirable to provide a lighting source that generates white light having a high color rendering index, so that objects illuminated by the lighting panel may appear more natural. Accordingly, such lighting sources may typically include an array of solid state lighting devices including red, green and blue light emitting devices. When red, green and blue light emitting devices are energized simultaneously, the resulting combined light may appear white, or nearly white, depending on the relative intensities of the red, green and blue sources. There are many different hues of light that may be considered "white." For example, some "white" light, such as light generated by sodium vapor lighting devices, may appear yellowish in color, while other "white" light, such as light generated by some fluorescent lighting devices, may appear more bluish in color.

The chromaticity of a particular light source may be referred to as the "color point" of the source. For a white light source, the chromaticity may be referred to as the "white point" of the source. The white point of a white light source may fall along a locus of chromaticity points corresponding to the color of light emitted by a black-body radiator heated to a given temperature. Accordingly, a white point may be identified by a correlated color temperature (CCT) of the light source, which is the temperature at which the heated black-body radiator matches the hue of the light source. White light typically has a CCT of between about 4000 and 8000K. White light with a CCT of 4000 has a yellowish color, while light with a CCT of 8000K is more bluish in color.

For larger illumination applications, multiple solid state lighting panels may be connected together, for example, in a two dimensional array, to form a lighting system. Unfortunately, however, the hue of white light generated by the lighting system may vary from panel to panel, and/or even from lighting device to lighting device. Such variations may result from a number of factors, including variations of intensity of emission from different LEDs, and/or variations in placement of LEDs in a lighting device and/or on a panel. Accordingly, in order to construct a multi-panel lighting system that produces a consistent hue of white light from panel to panel, it may be desirable to measure the hue and saturation, or chromaticity, of light generated by a large number of panels, and to select a subset of panels having a relatively close chromaticity for use in the multi-panel lighting system. This may result in decreased yields and/or increased inventory costs for a manufacturing process.

Moreover, even if a solid state lighting panel has a consistent, desired hue of light when it is first manufactured, the hue and/or brightness of solid state devices within the panel may vary non-uniformly over time and/or as a result of temperature variations, which may cause the overall color point of a lighting panel made up of the panels to change over time and/or may result in non-uniformity of color across the lighting panel. In addition, a user may wish to change the light output characteristics of a lighting panel in order to provide a desired hue and/or brightness level of the lighting panel.

Solid state lighting sources may have a number of advantages over conventional lighting sources for general illumination. For example, a conventional incandescent spotlight may include a 150 watt lamp projecting light from a 30 square inch aperture. Thus, the source may dissipate about 5 watts of power per square inch. Such sources may have an efficiency of no more than about 10 lumens per watt, which means that in terms of ability to generate light in a given area, such a source may generate about 50 lumens per square inch in a relatively small space.

A conventional incandescent spotlight provides a relatively bright, highly directed source of light. However, an incandescent spotlight may illuminate only a small area. Thus, even though an incandescent spot light has a relatively high light output, it may not be suitable for general illumination, for example illumination of a room. Thus, when used indoors, spotlights are typically reserved for accent or fill-in lighting applications.

Fluorescent light bulbs, on the other hand, produce light in a manner that is more suitable for general illumination. Fluorescent light bulbs approximate line sources of light, for which the intensity falls off in proportion to 1/r near the source, where r is the distance from the source. Furthermore, fluorescent light sources are typically grouped in a panel to approximate a plane source of light, which may be more useful for general interior illumination and/or other purposes, since the intensity of the light generated by a plane source may not drop off as quickly near the source as the intensity of a point or line source of light does.

A typical fluorescent light source may include three bulbs, which may emit 40 watts of light per bulb, for a total of 120 watts. A typical fluorescent panel for general interior illumination may have dimensions of about 24"×48", which corresponds to about 0.1 watts per square inch of power dissipation. A fluorescent light source may produce up to about 65 lumens per watt, for an overall luminance of about 7 lumens per square inch for a 24"×48" lighting panel. Even though this may be significantly less than the luminance of an incandescent spotlight of similar power, the distributed nature of a fluorescent light panel and its suitability for interior illumination has made fluorescent light panels a popular choice for general lighting applications. As noted above, however, fluorescent light may appear slightly bluish or washed out. Furthermore, fluorescent light bulbs may present environmental difficulties, since they may include mercury as a component.

Accordingly, there is a continued need for improved lighting sources for general illumination.

SUMMARY

A lighting panel according to some embodiments of the invention includes at least one tile, or an LED module having one or more LEDs mounted thereon, having a first side parallel to a principal plane of the lighting panel, a plurality of solid state lighting devices arranged on the first side of the at least one tile and configured to emit light, a reflector sheet on the first side of the at least one tile, and a brightness enhancement film on the reflector sheet. The reflector sheet may be arranged between the at least one tile and the brightness enhancement film and the brightness enhancement film may be configured to preferentially emit light having a first orientation from the lighting panel and to preferentially reflect light having a second orientation, different from the first orientation, back into the lighting panel.

The reflector sheet may be configured to reflect and disperse light incident thereon. The reflector sheet may include a plurality of apertures therethrough, respective ones of the plurality of apertures aligned with corresponding ones of the plurality of solid state lighting devices. Respective ones of the apertures may include angled sidewalls to thereby form reflective optical cavities around the corresponding ones of the plurality of solid state lighting devices. In particular embodiments, the reflector sheet may include a plastic foam.

The lighting panel may further include a diffuser sheet between the reflector sheet and the brightness enhancement film. The brightness enhancement film may include a plurality of three dimensional light extraction features configured to bend at least some light rays passing through the brightness enhancement film toward the direction normal to the principal plane of the lighting panel. The light extraction features may be random features.

The brightness enhancement film may be configured to limit direct emission from the lighting panel of light emitted by the plurality of solid state light emitting devices to thereby encourage light recycling/diffusion in the lighting panel. In some embodiments, the light extraction features include fresnel-type lenses, and/or the brightness enhancement film may be configured to substantially collimate light emitted by the lighting panel.

The lighting panel may further include a heatsink panel on a second side of the at least one tile opposite to the first side and configured to draw heat away from the at least one tile in a direction opposite to a direction of light emission from the at least one tile. The heatsink panel may include black anodized aluminum.

The heatsink panel may include a plurality of heatsink features configured to reduce a thermal resistance of the heatsink panel. The plurality of heatsink features may include cooling fins. Respective ones of the plurality of heatsink features may be aligned with corresponding ones of the plurality of solid state light emitting devices.

Some embodiments of the invention provide a luminaire adapted for general illumination. The luminaire includes a lighting panel including at least one tile, a plurality of solid state lighting devices electrically connected in a string and arranged on a first side of the at least one tile and configured to emit light at a dominant wavelength, a reflector sheet on the first side of the at least one tile, and a brightness enhancement film on the reflector sheet. The reflector sheet may be arranged between the at least one tile and the brightness enhancement film. The luminaire further includes a current supply circuit configured to supply an on-state drive current to the string in response to a control signal, a photosensor arranged to receive light from at least one of the plurality of solid state lighting devices, and a control system configured to receive an output signal from the photosensor and to adjust the control signal responsive to the output signal of the photosensor to thereby adjust an average current supplied to the string by the current supply circuit.

The current supply circuit may include a closed loop variable voltage boost converter current source. The control system may be configured to sample the output of the photosensor when current may be not being supplied to the string of solid state lighting devices to obtain an ambient light value. The control system may be configured to decrease average current to the string as the ambient light value increases.

The control system may be configured to sample the photosensor during an interval in which current may be being supplied to the string in order to obtain a brightness value. The control system may be configured to decrease the average current to the first string as the brightness value increases.

The control system may be configured to adjust the average current supplied to the string based on the ambient light value and the brightness value.

The control system may be configured to adjust the average current supplied to the string based on a difference between the ambient light value and the brightness value.

The control system may be configured to adjust the average current supplied to the string based on a ratio of the ambient light value and the brightness value. In some embodiments, the control system may be configured to maintain an average luminosity of the first string independent of an ambient/background illumination.

The control system may be configured to maintain a relationship between an ambient/background illumination and an average luminosity of the string by providing a first feedback signal with respect to the ambient light value and a second feedback signal with respect to the brightness value.

The control signal may include a pulse width modulation (PWM) signal, and the control system may be configured to control an average current supplied to the string by varying a duty cycle of the PWM signal.

The control system may be configured to control an average current supplied to the string by varying a pulse frequency of the control signal.

The current supply circuit may be configured to maintain the on-state current supplied to the string at a substantially constant value even as the average current supplied to the string may be varied.

The control system may include a color management unit coupled to the photosensor and configured to sample and process the output signal of the photosensor and to provide the processed output signal to the control system.

The luminaire may further include a temperature sensor configured to sense a temperature associated with the lighting panel, the control system may be configured to adjust an average current supplied to the first string in response to a change in the sensed temperature.

A luminaire according to further embodiments of the invention includes a lighting panel including at least one tile and at least a first string of solid state lighting devices on a first side of the at least one tile and configured to emit light at a first dominant wavelength and a second string of solid state lighting devices configured to emit light at a second dominant wavelength, different from the first dominant wavelength. The lighting panel further includes a reflector sheet on the first side of the at least one tile, and a brightness enhancement film on the reflector sheet. The reflector sheet may be arranged between the at least one tile and the brightness enhancement film.

The luminaire further includes a first current supply circuit configured to supply an on-state drive current to the first string in response to a first control signal, and a second current supply circuit configured to supply an on-state drive current to the second string in response to a second control signal.

The luminaire further includes a photosensor arranged to receive light from at least one solid state lighting device in the first string and at least one solid state lighting device in the second string, and a control system configured to receive an output signal from the photosensor and to adjust the first control signal and/or the second control signal responsive to the output signal of the photosensor to thereby adjust an average current supplied to the first string by the first current supply circuit and/or to adjust an average current supplied to the second string by the second current supply circuit, such that the photosensor, the control system and the first and second current supply circuits thereby form a feedback loop for the lighting panel.

The first and second control signals may include pulse width modulation (PWM) signals, and the control system may be configured to control an average current supplied to the first and/or second string by varying a duty cycle of the first and/or second control signal.

A leading edge of a pulse of the first control signal occurs at a different time from a leading edge of a pulse of the second control signal. The leading edge of the pulse of the first control signal may be delayed from the leading edge of the pulse of the second control signal by a fixed delay and/or a variable delay. The variable delay may change within a range of delay intervals that may be random, chaotic or determined by a sweep function, table or other technique, and/or may be dependent on the pulse width of the first control signal and/or the second control signal.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
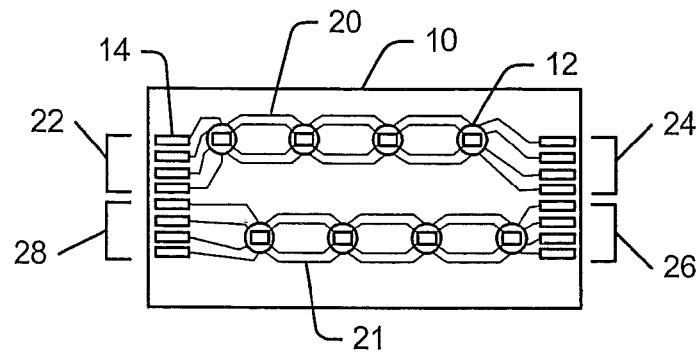
FIG. 1 is a front view of a solid state lighting tile in accordance with some embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" or "front" or "back" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

The present invention is described below with reference to flowchart illustrations and/or block diagrams of methods, systems and computer program products according to embodiments of the invention. It will be understood that some blocks of the flowchart illustrations and/or block diagrams, and combinations of some blocks in the flowchart illustrations and/or block diagrams, can be implemented by computer program instructions. These computer program instructions may be stored or implemented in a microcontroller, microprocessor, digital signal processor (DSP), field programmable gate array (FPGA), a state machine, programmable logic controller (PLC) or other processing circuit, general purpose computer, special purpose computer, or other programmable data processing apparatus such as to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Referring now to FIG. 1, a solid state lighting tile 10 is shown that may be used as a functional building block to create a large area planar light source. However, it will be understood that a large area planar light source may include only one tile. A solid state lighting tile 10 may include thereon a number of solid state lighting elements 12 arranged in a regular and/or irregular one- or two-dimensional array. The tile 10 may include, for example, a printed circuit board (PCB) on which one or more circuit elements, such as discrete light emitting components, may be mounted. In particular, a tile 10 may include a metal core PCB (MCPCB) including a metal core having thereon a polymer coating on which patterned metal traces (not shown) may be formed. MCPCB material, and material similar thereto, is commercially available from, for example, The Bergquist Company. The PCB may further include heavy clad (4 oz. copper or more) and/or conventional FR-4 PCB material with thermal vias. MCPCB material may provide improved thermal performance compared to conventional PCB material. However, MCPCB material may also be heavier than conventional PCB material, which may not include a metal core.

In the embodiments illustrated in FIG. 1, the lighting elements 12 are multi-chip clusters of four solid state emitting devices per cluster. In the tile 10, four lighting elements 12 are serially arranged in a first path 20, while four lighting elements 12 are serially arranged in a second path 21. The lighting elements 12 of the first path 20 are connected, for example via printed circuits, to a set of four anode contacts 22 arranged at a first end of the tile 10, and a set of four cathode contacts 24 arranged at a second end of the tile 10. The lighting elements 12 of the second path 21 are connected to a set of four anode contacts 26 arranged at the second end of the tile 10, and a set of four cathode contacts 28 arranged at the first end of the tile 10.

In some embodiments of the invention, the lighting elements 12 are chip-on-board clusters including one or more LEDs configured to emit in the blue or UV spectrum. A wavelength conversion material is arranged to receive light emitted by the LEDs and to responsively emit a longer wavelength light, such as a red, green, blue and/or yellow light. The emitted light may combine with other light to produce a white light. In some embodiments, the lighting elements 12 include blue LEDs coated with a wavelength conversion material including at least a yellow phosphor. As is known in the art, yellow light emitted by the phosphor may combine with unconverted blue light emitted by the LEDs to produce a white light. A lighting element 12 may further include a red-emitting phosphor. Red light from the red emitting phosphor may combine with the blue and yellow light emitted by the LEDs and the yellow phosphor, respectively, to produce a warmer white light having better color rendering characteristics.

Figure 2:
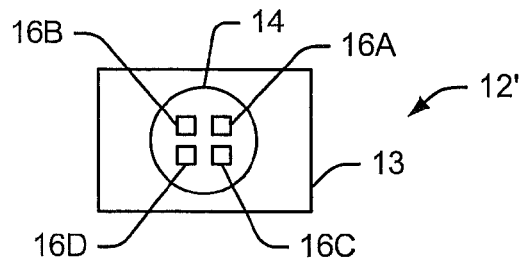
FIG. 2 is a top view of a packaged solid state lighting device including a plurality of LEDs in accordance with some embodiments of the invention.

The solid state lighting elements 12 may include, for example, organic and/or inorganic light emitting devices. An example of a solid state lighting element 12' for high power illumination applications according to some other embodiments is illustrated in FIG. 2. Instead of a chip-on-board arrangement, a solid state lighting element 1T may include a packaged discrete electronic component including a carrier substrate 13 on which a plurality of LED chips 16A-16D are mounted.

The LED chips 16A-16D of a light emitting element 12 or 12' may include at least a red LED 16A, a green LED 16B and a blue LED 16C. The blue and/or green LEDs may be InGaN-based blue and/or green LED chips available from Cree, Inc., the assignee of the present invention. The red LEDs may be, for example, AlInGaP LED chips available from Epistar, Osram and others. The lighting device 12 may include an additional green LED 16D in order to make more green light available.

In some embodiments, the LEDs 16 may have a square or rectangular periphery with an edge length of about 900 μm or greater (i.e. so-called "power chips." However, in other embodiments, the LED chips 16 may have an edge length of 500 μm or less (i.e. so-called "small chips"). In particular, small LED chips may operate with better electrical conversion efficiency than power chips. For example, green LED chips with a maximum edge dimension less than 500 microns and as small as 260 microns, commonly have a higher electrical conversion efficiency than 900 micron chips, and are known to typically produce 55 lumens of luminous flux per Watt of dissipated electrical power and as much as 90 lumens of luminous flux per Watt of dissipated electrical power.

As further illustrated in FIG. 2, the LEDs 16A-16D may be covered by an encapsulant 14, which may be clear and/or may include light scattering particles, phosphors, and/or other elements to achieve a desired emission pattern, color and/or intensity. While not illustrated in FIG. 2, the lighting device 12 may further include a reflector cup surrounding the LEDs 16A-16D, a lens mounted above the LEDs 16A-16D, one or more heat sinks for removing heat from the lighting device, an electrostatic discharge protection chip, and/or other elements.

Figure 3:
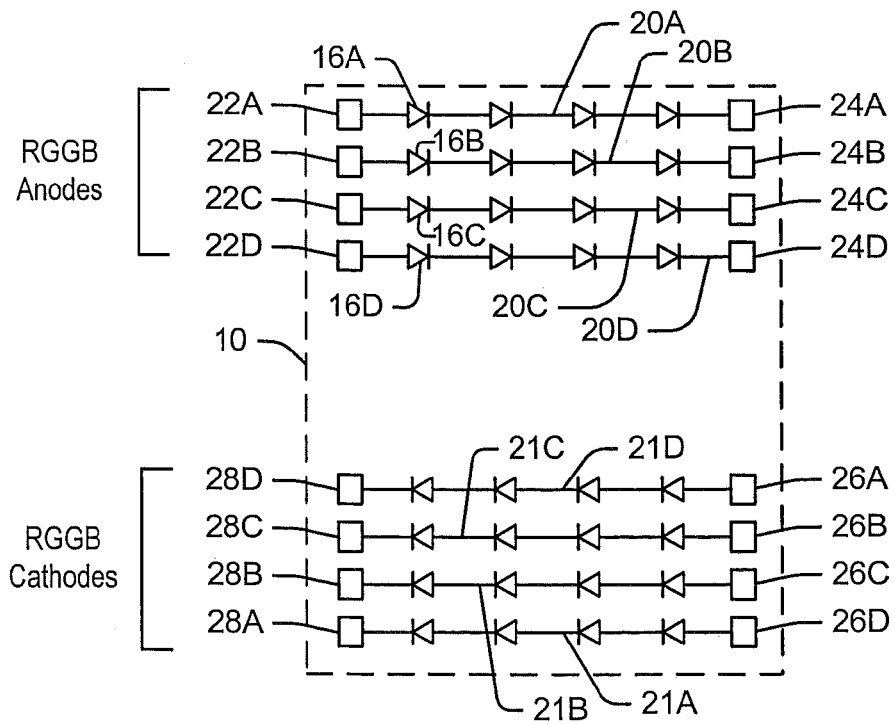
FIG. 3 is a schematic circuit diagram illustrating the electrical interconnection of LEDs in a solid state lighting tile in accordance with some embodiments of the invention.

LED chips 16A-16D of the lighting elements 12 in the tile 10 may be electrically interconnected as shown in the schematic circuit diagram in FIG. 3. As shown therein, the LEDs may be interconnected such that the blue LEDs 16A in the first path 20 are connected in series to form a string 20A. Likewise, the first green LEDs 16B in the first path 20 may be arranged in series to form a string 20B, while the second green LEDs 16D may be arranged in series to form a separate string 20D. The red LEDs 16C may be arranged in series to form a string 20C. Each string 20A-20D may be connected to an anode contact 22A-22D arranged at a first end of the tile 10 and a cathode contact 24A-24D arranged at the second end of the tile 10, respectively.

A string 20A-20D may include all, or less than all, of the corresponding LEDs in the first path 20 or the second path 21. For example, the string 20A may include all of the blue LEDs from all of the lighting elements 12 in the first path 20. Alternatively, a string 20A may include only a subset of the corresponding LEDs in the first path 20. Accordingly the first path 20 may include four serial strings 20A-20D arranged in parallel on the tile 10.

The second path 21 on the tile 10 may include four serial strings 21A, 21B, 21C, 21D arranged in parallel. The strings 21A to 21D are connected to anode contacts 26A to 26D, which are arranged at the second end of the tile 10 and to cathode contacts 28A to 28D, which are arranged at the first end of the tile 10, respectively.

It will be appreciated that, while the embodiments illustrated in FIGS. 1-3 include four LED chips 16 per lighting element 12 which are electrically connected to form at least four strings of LEDs 16 per path 20, 21, more and/or fewer than four LED chips 16 may be provided per lighting device 12, and more and/or fewer than four LED strings may be provided per path 20, 21 on the tile 10. For example, a lighting device 12 may include only one green LED chip 16B, in which case the LEDs may be connected to form three strings per path 20, 21. Likewise, in some embodiments, the two green LED chips in a lighting device 12 may be connected in serial to one another, in which case there may only be a single string of green LED chips per path 20, 22. Further, a tile 10 may include only a single path 20 instead of plural paths 20, 21 and/or more than two paths 20, 21 may be provided on a single tile 10. In addition, the lighting devices 12 may have a single emission color and may be combined with a wavelength conversion phosphor to produce a desired color of light.

Figure 4A:
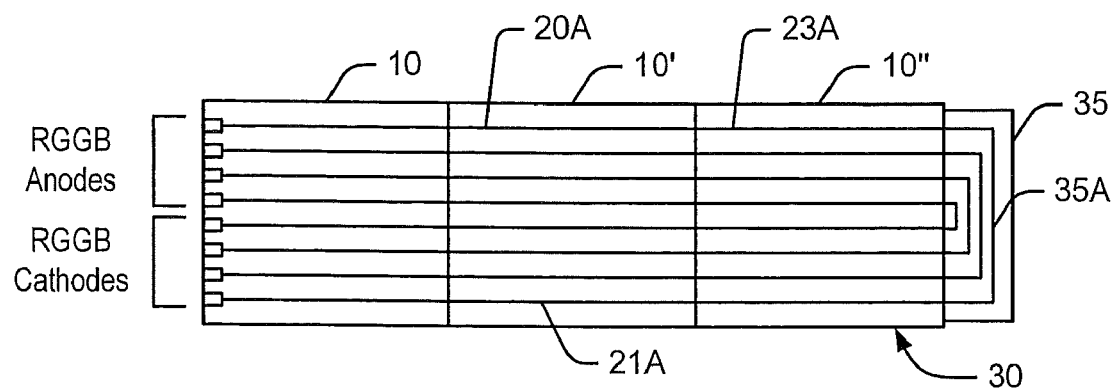
FIG. 4A is a front view of a bar assembly including multiple solid state lighting tiles in accordance with some embodiments of the invention.

Multiple tiles 10 may be assembled to form a larger lighting bar assembly 30 as illustrated in FIG. 4A. As shown therein, a bar assembly 30 may include two or more tiles 10, 10', 10" connected end-to-end. Accordingly, referring to FIGS. 3 and 4, the cathode contacts 24 of the first path 20 of the leftmost tile 10 may be electrically connected to the anode contacts 22 of the first path 20 of the central tile 10', and the cathode contacts 24 of the first path 20 of the central tile 10' may be electrically connected to the anode contacts 22 of the first path 20 of the rightmost tile 10", respectively. Similarly, the anode contacts 26 of the second path 21 of the leftmost tile 10 may be electrically connected to the cathode contacts 28 of the second path 21 of the central tile 10', and the anode contacts 26 of the second path 21 of the central tile 10' may be electrically connected to the cathode contacts 28 of the second path 21 of the rightmost tile 10", respectively.

Furthermore, the cathode contacts 24 of the first path 20 of the rightmost tile 10" may be electrically connected to the anode contacts 26 of the second path 21 of the rightmost tile 10" by a loopback connector 35. For example, the loopback connector 35 may electrically connect the cathode 24A of the string 20A of blue LED chips 16A of the first path 20 of the rightmost tile 10" with the anode 26A of the string 21A of blue LED chips of the second path 21 of the rightmost tile 10". In this manner, the string 20A of the first path 20 may be connected in series with the string 21A of the second path 21 by a conductor 35A of the loopback connector 35 to form a single string 23A of blue LED chips 16. The other strings of the paths 20, 21 of the tiles 10, 10', 10" may be connected in a similar manner.

The loopback connector 35 may include an edge connector, a flexible wiring board, or any other suitable connector. In addition, the loop connector may include printed traces formed on/in the tile 10.

While the bar assembly 30 shown in FIG. 4A is a one dimensional array of tiles 10, other configurations are possible. For example, the tiles 10 could be connected in a two-dimensional array in which the tiles 10 are all located in the same plane, or in a three dimensional configuration in which the tiles 10 are not all arranged in the same plane. Furthermore the tiles 10 need not be rectangular or square, but could, for example, be hexagonal, triangular, or the like.

Figure 4B:
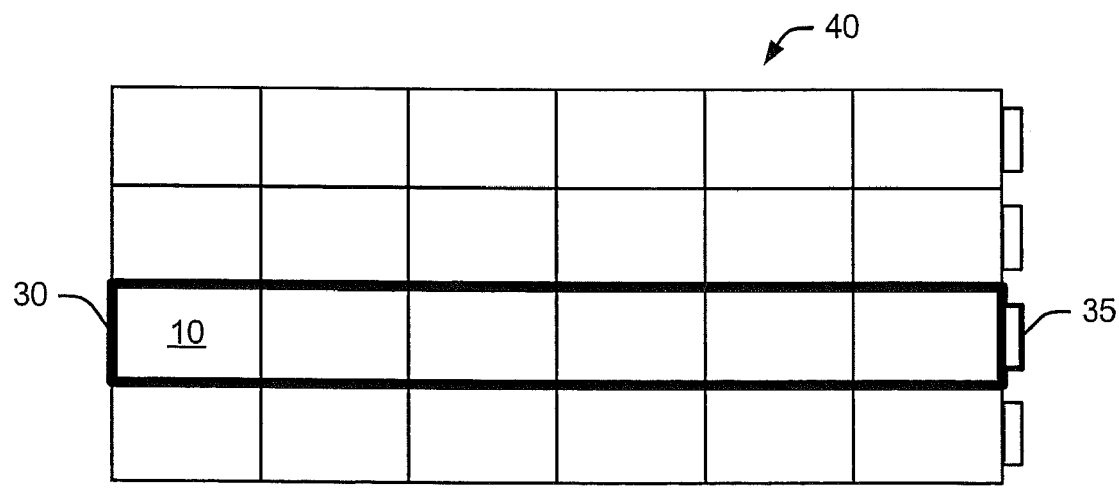
FIG. 4B is a front view of a lighting panel in accordance with some embodiments of the invention including multiple bar assemblies.

Referring to FIG. 4B, in some embodiments, a plurality of bar assemblies 30 may be combined to form a lighting panel 40, which may be used, for example, as a planar illumination source for general illumination. As shown in FIG. 4B, a lighting panel 40 may include four bar assemblies 30, each of which includes six tiles 10. The rightmost tile 10 of each bar assembly 30 includes a loopback connector 35. Accordingly, each bar assembly 30 may include four strings 23 of LEDs (i.e. one red, two green and one blue).

In some embodiments, a bar assembly 30 may include four LED strings 23 (one red, two green and one blue). Thus, a lighting panel 40 including nine bar assemblies may have 36 separate strings of LEDs. Moreover, in a bar assembly 30 including six tiles 10 with eight solid state lighting elements 12 each, an LED string 23 may include 48 LEDs connected in serial.

Figure 5A:
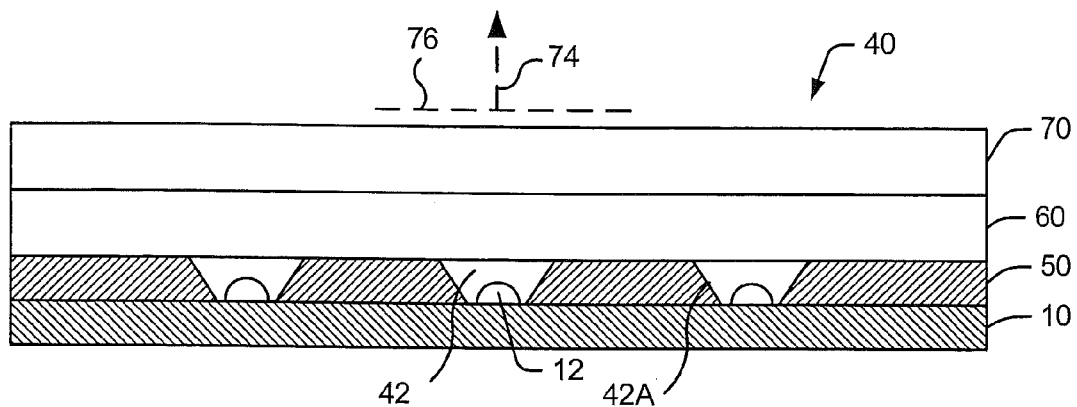
FIGS. 5A-5B are cross sectional illustrations of lighting panels in accordance with some embodiments of the invention.

Referring to FIG. 5A, a portion of a lighting panel 40 is shown in side view. The lighting panel 40 includes at least one tile 10 on which a plurality of lighting elements 12 are disposed on one side thereof. For simplicity, only a single tile 10 is shown in FIG. 5A. In order to provide and/or improve light recycling in the lighting panel 40, a reflector sheet 50 may be provided on the same side of the tile 10 as the lighting elements 12. In some embodiments, a single reflector sheet 50 may be provided having a length and width similar to the length and width of the two-dimensional lighting panel 40. In other embodiments, a plurality of reflector sheets may be provided, and the reflector sheets 50 may be smaller than the lighting panel 40. In some embodiments, each tile 10 may include a separate reflector sheet 50 thereon.

The reflector sheet 50 may include a plurality of apertures 42 therein, which apertures 42 may align with the lighting elements 12 on the tile 10.

The reflector sheet 50 may be formed, for example, of a lightweight reflective material that both reflects and scatters incident light. In some embodiments, the reflector sheet 50 may include a white plastic foam material such as polyethylene-terephthalate (PET) plastic that has been processed into a lightweight white foam. Accordingly, in addition to reflecting incident light, the reflector sheet 50 may help disperse the incident light so that it is reflected in a random direction (i.e. a lambertian reflector), which may improve the uniformity of the lighting panel 40.

In some embodiments, the apertures 42 may be circular apertures, and may have a sidewall 42A that is angled with respect to the surface of the tiles 10, thereby forming reflective optical cavities around the lighting elements 12.

The lighting panel 40 may further include a brightness enhancement film 70 separated from the tile 10 and the reflector sheet 50 by a diffuser sheet 60. The diffuser sheet 60 may scatter light passing therethrough in order to further diffuse light emitted by the lighting elements 12 and/or reflected by the reflector sheet 50. Diffuser sheets are commonly used, for example, in display panels, as is known to those skilled in the art.

Figure 5B:
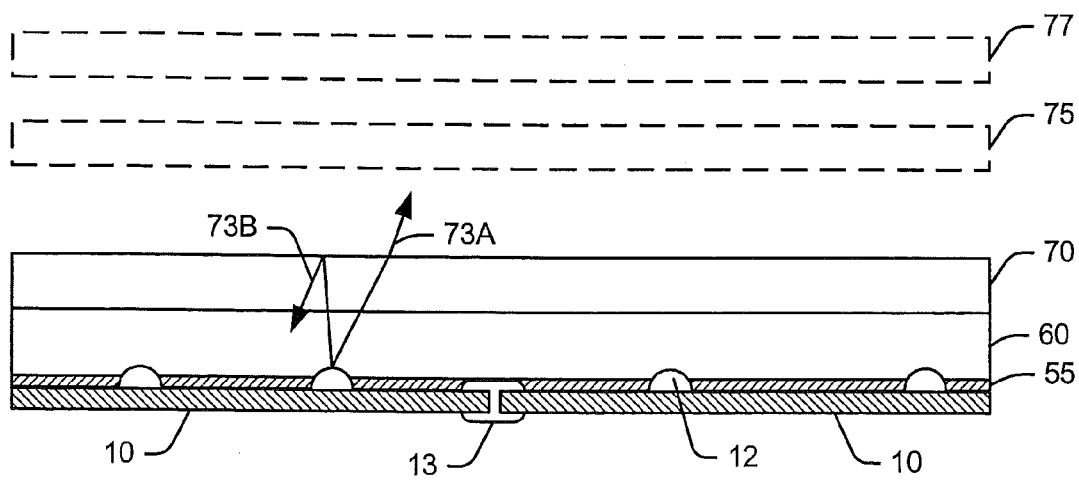

Additional embodiments of the invention are illustrated in FIG. 5B, in which a pair of tiles 10 are shown. The panels 10 may be connected at respective opposing edges by an edge connector 13, which may provide an electrical and/or mechanical connection between adjacent tiles 10. In the embodiments of FIG. 5B, a reflector sheet 55 is provided as a reflective coating on the same surface of the tiles 10 as the lighting elements 12. The coating may include, for example, a white paint that is configured to reflect and scatter light incident thereon. A diffuser sheet 60 is provided on the reflector sheet 55.

Also illustrated in FIG. 5B are optional additional layers 75 and 77, which may include layers configured to diffuse, polarize, collimate and/or reflect light. Such additional optional layers may be provided to improve the brightness and/or uniformity of light emitted by the panel 40, and/or otherwise to provide a desired emission pattern.

As shown in FIG. 5B, some light rays, such as light ray 73A are emitted by the panel 40, while other light rays, such as light ray 73B, are reflected back into the panel 40 where they may be recycled (i.e. emitted at a different location/direction). Such light recycling may improve the uniformity of emission from the panel 40.

Figure 6A:
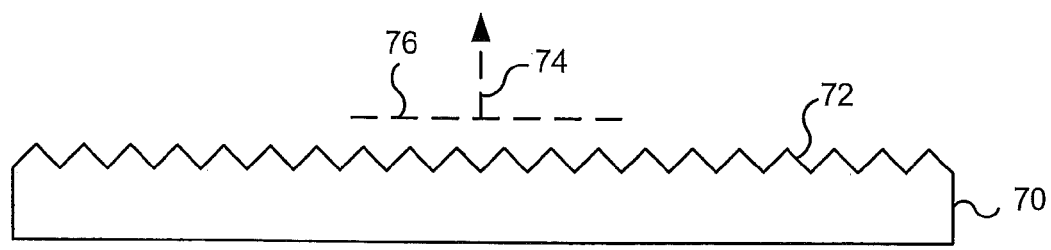
FIGS. 6A-6B are schematic illustrations of a brightness enhancement film according to some embodiments of the invention.
Figure 6B:
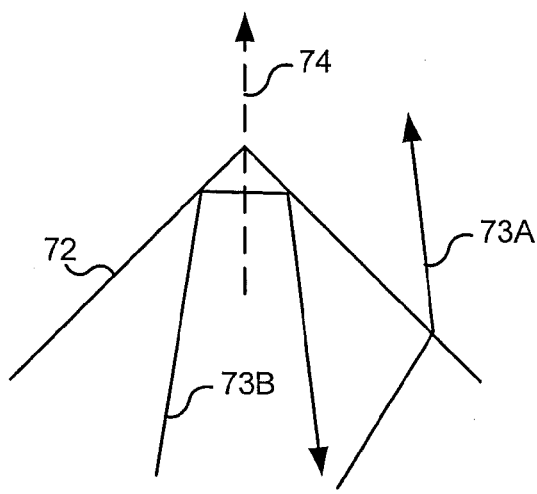

As shown in FIGS. 6A and 6B, the brightness enhancement film 70 may include a plurality of three dimensional light extraction features 72 which may include sidewalls that are angled with respect to the principal plane of the lighting panel 40 such that light rays incident thereon, such as light ray 73A, are bent toward a an optical axis 74 that is perpendicular to the principal plane 76 of the lighting panel 40 when they exit the film 70 or are internally reflected back into the diffuser sheet 60, such as light ray 73B, where they may be further recycled and/or diffused. In this manner, light emitted by the lighting panel 40 may be further collimated to increase the on-axis intensity of the emitted light.

In various embodiments, the shape of the light extraction features 72 may be regular, irregular and/or random to produce a desired effect on light passing through the diffuser sheet 60. In some embodiments, the light extraction features may be defined to discourage and/or limit direct emission from the lighting panel 40 of light emitted by the lighting elements 12, for example, in order to reduce "hot spots" near the locations of the lighting elements 12. In other words, the light extraction features 72 may be designed and configured to encourage light recycling/diffusion in the lighting panel 40 in order to improve uniformity of emission from the lighting panel 40. Thus, for example, the light extraction features 72 may include sidewalls sloped at an angle such that light traveling approximately parallel to an optical axis 74 of the lighting panel 40 (i.e. perpendicular to the plane of the panel 40) will be totally internally reflected back into the diffuser sheet 60. That is, light, such as the light ray 73B may strike a sidewall of the light extraction feature 72 at an angle that is greater than the critical angle defined by the difference index of refraction between the brightness enhancement film 70 and the medium on the other side of the film 70 (which may be, for example, air). In other embodiments, the light extraction features may be arranged to form an array of fresnel-type lenses which may substantially collimate light emitted by the lighting elements 12.

Figure 7:
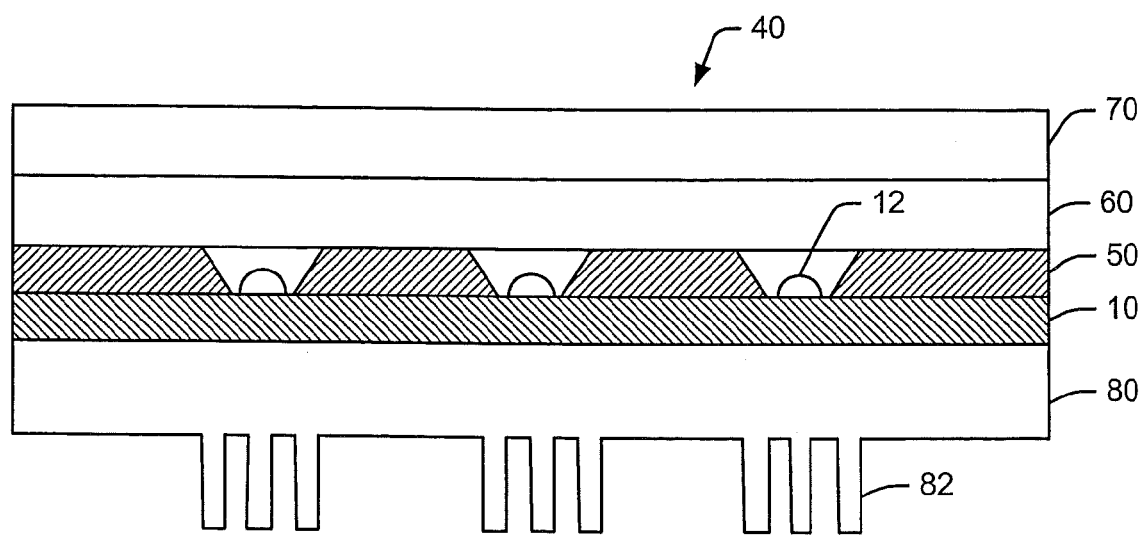
FIG. 7 is a cross sectional illustration of a lighting panel in accordance with further embodiments of the invention.

Referring to FIG. 7, the lighting panel 40 may further include a heatsink panel 80 provided on a side of the tiles 10 opposite to the lighting elements 12. Thus, heat may be extracted from the lighting panel 40 in a direction opposite to the direction of light emission. The heatsink panel 80 may include a plurality of heatsink features 82, such as cooling fins, which may increase the surface area over which heat is dissipated, thereby decreasing the thermal resistance of the heatsink panel 80. The heatsink features 82 may be positioned opposite the lighting elements 12. The heatsink panel 80 may be coated and/or treated in a manner that decreases the thermal resistance of the heatsink panel. For example, the heatsink panel 80 may include black anodized aluminum for improved heat emission.

Figure 16:
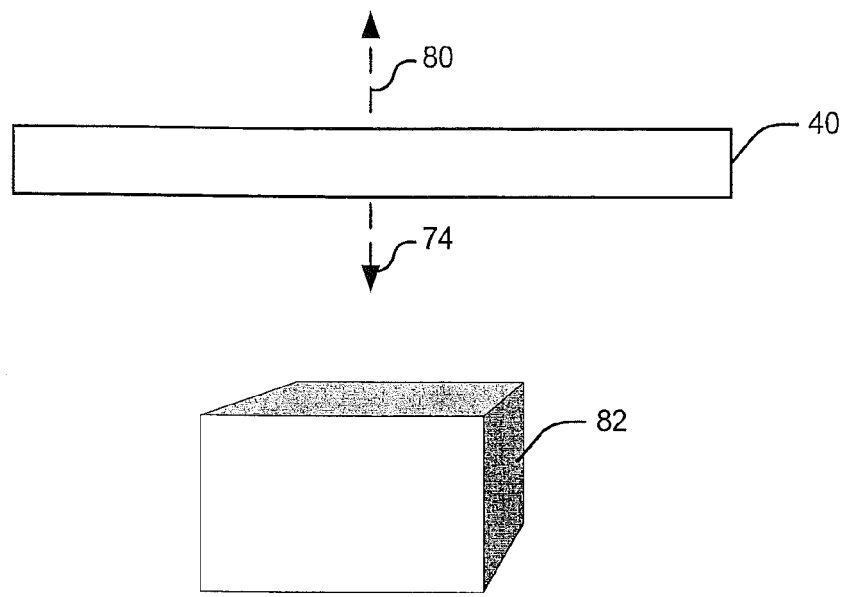
FIG. 16 is a schematic illustration of a lighting panel according to some embodiments of the invention.

In operation, a lighting panel 40 will typically be mounted above an area to be illuminated, i.e., with the light emission of the lighting panel 40 directed downward. Such a configuration is shown in FIG. 16, which illustrates a lighting panel 40 positioned above an object 82 to be illuminated. In that case, the heatsink features 82 will be oriented above the tiles 10 of the panel 40, and heat generated by the luminaire in which the lighting panel 40 is used will be preferentially extracted upwards from the panel 40 (direction 80), while light is directed downward (direction 74), opposite to the direction of heat extraction. Thus, heat generated by the luminaire may be more efficiently extracted, since heat tends to rise. Heating of an airspace above the panel 40 by the heatsink panel 80 may also generate convection currents, which may contribute further to cooling the panel 40.

A lighting panel 40 according to some embodiments of the invention may provide a substantially planar source of light that may be suitable for general illumination, such as illumination of rooms. Furthermore, a lighting panel 40 according to some embodiments of the invention may have significant advantages over a conventional fluorescent light source for general illumination applications. For example, due to the fact that multiple tiles 10 may be combined to form a single lighting panel 40, a lighting panel 40 according to some embodiments of the invention may have a relatively large area. The use of distributed point sources such as lighting elements 12 may permit a large amount of optical power to be distributed over a relatively large area. For example, a lighting panel 40 having dimensions of 18"×25" has a total area of 450 square inches. Highly efficient solid state lighting sources 12 may generate in excess of 50 lumens per watt. Thus, a typical lighting panel 40 may generate approximately 5616 lumens, or about 12.5 lumens per square inch of the panel. This compares favorably with the approximately 7 lumens per square inch output by a typical fluorescent luminaire.

Furthermore, providing a large number of distributed lighting sources 12 in the panel 40 may improve the efficiency and/or uniformity of the panel 40. For example, as discussed above, small LED chips (less than 500 μm$^2$ in area) are typically more efficient than larger, so-called "power chips." In addition, providing a large number of lighting sources 12 in the panel 40 may facilitate the diffusion and recycling of light in the panel 40, which may improve uniformity.

For some types of LEDs, in particular blue and/or green LEDs, the forward voltage (Vf) may vary by as much as +/−0.75V from a nominal value from chip to chip at a standard drive current of 20 mA. A typical blue or green LED may have a Vf of 3.2 Volts. Thus, the forward voltage of such chips may vary by as much as 25%. For a string of LEDs containing 48 LEDs, the total Vf required to operate the string at 20 mA may vary by as much as +/−36V.

Accordingly, depending on the particular characteristics of the LEDs in a bar assembly, a string of one light bar assembly (e.g. the blue string) may require significantly different operating power compared to a corresponding string of another bar assembly. These variations may significantly affect the color and/or brightness uniformity of a lighting panel that includes multiple tiles 10 and/or bar assemblies 30, as such Vf variations may lead to variations in brightness and/or hue from tile to tile and/or from bar to bar. For example, current differences from string to string may result in large differences in the flux, peak wavelength, and/or dominant wavelength output by a string. Variations in LED drive current on the order of 5% or more may result in unacceptable variations in light output from string to string and/or from tile to tile. Such variations may significantly affect the overall color gamut, or range of displayable colors, of a lighting panel.

In addition, the light output characteristics of LED chips may change during their operational lifetime. For example, the light output by an LED may change over time and/or with ambient temperature.

In order to allow consistent, controllable light output characteristics for a lighting panel, some embodiments of the invention provide a lighting panel having two or more serial strings of LED chips. An independent current control circuit is provided for each of the strings of LED chips. Furthermore, current to each of the strings may be individually controlled, for example, by means of pulse width modulation (PWM) and/or pulse frequency modulation (PFM). The width of pulses applied to a particular string in a PWM scheme (or the frequency of pulses in a PFM scheme) may be based on a pre-stored pulse width (frequency) value that may be modified during operation based, for example, on a user input and/or a sensor input.

Figure 8:
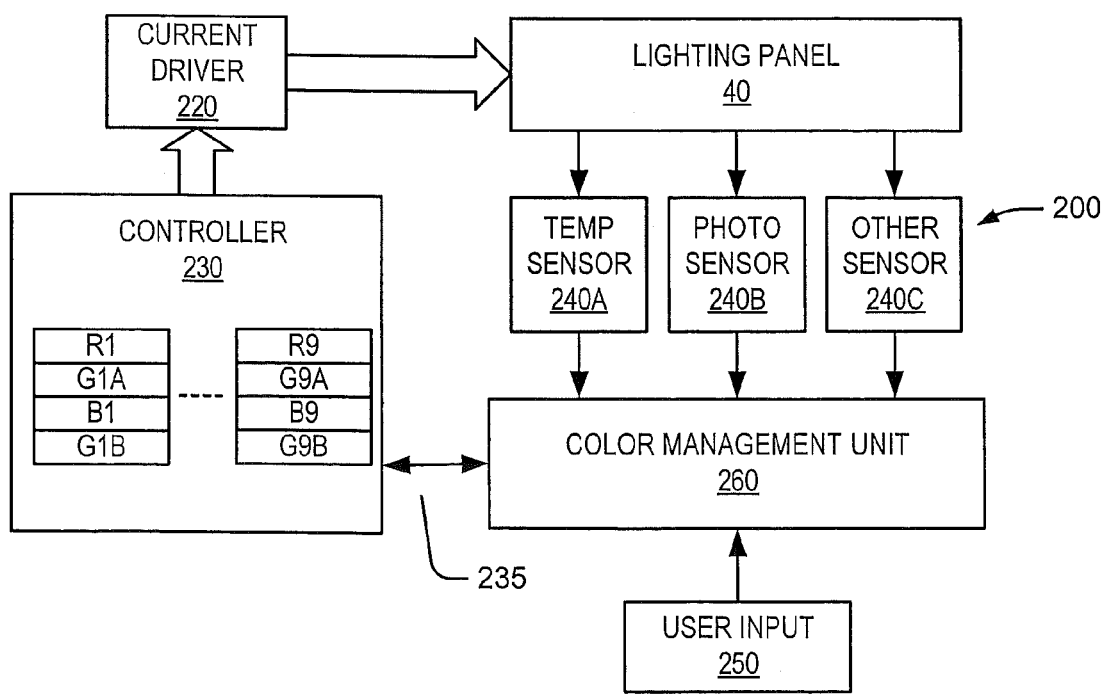
FIG. 8 is a schematic diagram illustrating a luminaire according to some embodiments of the invention.

Accordingly, referring to FIG. 8, a luminaire 200 according to some embodiments of the invention is shown. The luminaire 200, which may be a lighting fixture for general illumination, includes a lighting panel 40. The lighting panel 40 may include, for example, a plurality of bar assemblies 30, which, as described above, may include a plurality of tiles 10. However, it will be appreciated that embodiments of the invention may be employed in conjunction with lighting panels formed in other configurations. For example, some embodiments of the invention may be employed with solid state backlight panels that include a single, large area tile.

In particular embodiments, however, a lighting panel 40 may include a plurality of bar assemblies 30, each of which may have four cathode connectors and four anode connectors corresponding to the anodes and cathodes of four independent strings 23 of LEDs each having the same dominant wavelength. For example, each bar assembly 23 may have a red string 23A, two green strings 23B, 23D, and a blue string 23C, each with a corresponding pair of anode/cathode contacts on one side of the bar assembly 30. In particular embodiments, a lighting panel 40 may include nine bar assemblies 30. Thus, a lighting panel 40 may include 36 separate LED strings.

A current driver 220 provides independent current control for each of the LED strings 23 of the lighting panel 40. For example, the current driver 220 may provide independent current control for 36 separate LED strings in the lighting panel 40. The current driver 220 may provide a constant current source for each of the 36 separate LED strings of the lighting panel 40 under the control of a controller 230. In some embodiments, the controller 230 may be implemented using an 8-bit microcontroller such as a PIC18F8722 from Microchip Technology Inc., which may be programmed to provide pulse width modulation (PWM) control of 36 separate current supply blocks within the driver 220 for the 36 LED strings 23.

Pulse width information for each of the 36 LED strings may be obtained by the controller 230 from a color management unit 260, which may in some embodiments include a color management controller such as the Agilent HDJD-J822-SCR00 color management controller.

The color management unit 260 may be connected to the controller 230 through an I2C (Inter-Integrated Circuit) communication link 235. The color management unit 260 may be configured as a slave device on an I2C communication link 235, while the controller 230 may be configured as a master device on the link 235. I2C communication links provide a low-speed signaling protocol for communication between integrated circuit devices. The controller 230, the color management unit 260 and the communication link 235 may together form a feedback control system configured to control the light output from the lighting panel 40. The registers R1-R9, etc., may correspond to internal registers in the controller 230 and/or may correspond to memory locations in a memory device (not shown) accessible by the controller 230.

The controller 230 may include a register, e.g. registers R1-R9, G1A-G9A, B1-B9, G1B-G9B, for each LED string 23, i.e. for a lighting unit with 36 LED strings 23, the color management unit 260 may include at least 36 registers. Each of the registers is configured to store pulse width information for one of the LED strings 23. The initial values in the registers may be determined by an initialization/calibration process. However, the register values may be adaptively changed over time based on user input 250 and/or input from one or more sensors 240 coupled to the lighting panel 40.

The sensors 240 may include, for example, a temperature sensor 240A, one or more photosensors 240B, and/or one or more other sensors 240C. In particular embodiments, a lighting panel 40 may include one photosensor 240B for each bar assembly 30 in the lighting panel. However, in other embodiments, one photosensor 240B could be provided for each LED string 30 in the lighting panel. In other embodiments, each tile 10 in the lighting panel 40 may include one or more photosensors 240B.

In some embodiments, the photosensor 240B may include photo-sensitive regions that are configured to be preferentially responsive to light having different dominant wavelengths. Thus, wavelengths of light generated by different LED strings 23, for example a red LED string 23A and a blue LED string 23C, may generate separate outputs from the photosensor 240B. In some embodiments, the photosensor 240B may be configured to independently sense light having dominant wavelengths in the red, green and blue portions of the visible spectrum. The photosensor 240B may include one or more photosensitive devices, such as photodiodes. The photosensor 240B may include, for example, an Agilent HDJD-S831-QT333 tricolor photo sensor.

Sensor outputs from the photosensors 240B may be provided to the color management unit 260, which may be configured to sample such outputs and to provide the sampled values to the controller 230 in order to adjust the register values for corresponding LED strings 23 in order to correct variations in light output on a string-by-string basis. In some embodiments, an application specific integrated circuit (ASIC) may be provided on each tile 10 along with one or more photosensors 240B in order to pre-process sensor data before it is provided to the color management unit 260. Furthermore, in some embodiments, the sensor output and/or ASIC output may be sampled directly by the controller 230.

The photosensors 240B may be arranged at various locations within the lighting panel 40 in order to obtain representative sample data. Alternatively and/or additionally, light guides such as optical fibers may be provided in the lighting panel 40 to collect light from desired locations. In that case, the photosensors 240B could be provided, for example, on the back side of the lighting panel 40. Further, an optical switch may be provided to switch light from different light guides which collect light from different areas of the lighting panel 40 to a photosensor 240B. Thus, a single photosensor 240B may be used to sequentially collect light from various locations on the lighting panel 40.

The user input 250 may be configured to permit a user to selectively adjust attributes of the lighting panel 40, such as color temperature, brightness, hue, etc., by means of user controls such as input controls on a remote control panel.

The temperature sensor 240A may provide temperature information to the color management unit 260 and/or the controller 230, which may adjust the light output from the lighting panel on a string-to-string and/or color-to-color basis based on known/predicted brightness vs. temperature operating characteristics of the LED chips 16 in the strings 23.

Various configurations of photosensors 240B are shown in FIGS. 9A-9D. For example, in the embodiments of FIG. 9A, a single photosensor 240B is provided in the lighting panel 40. The photosensor 240B may be provided at a location where it may receive an average amount of light from more than one tile/string in the lighting panel 40.

Figure 9A:
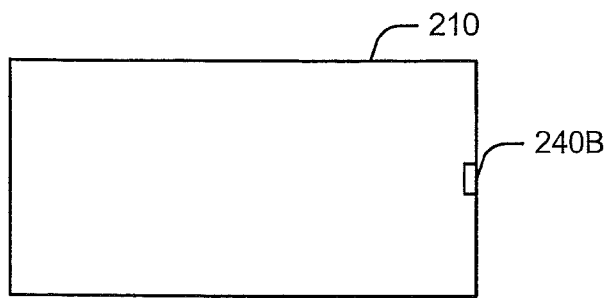
FIGS. 9A-9D are a schematic diagrams illustrating possible configurations of photosensors on a lighting panel in accordance with some embodiments of the invention.
Figure 9B:
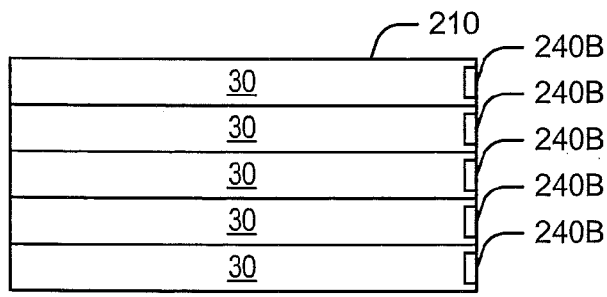

In order to provide more extensive data regarding light output characteristics of the lighting panel 40, more than one photosensor 240B may be used. For example, as shown in FIG. 9B, there may be one photosensor 240B per bar assembly 30. In that case, the photosensors 240B may be located at ends of the bar assemblies 30 and may be arranged to receive an average/combined amount of light emitted from the bar assembly 30 with which they are associated.

Figure 9C:
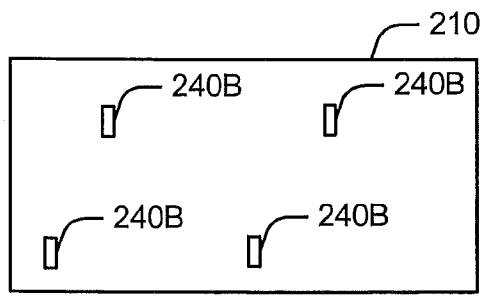
Figure 9D:
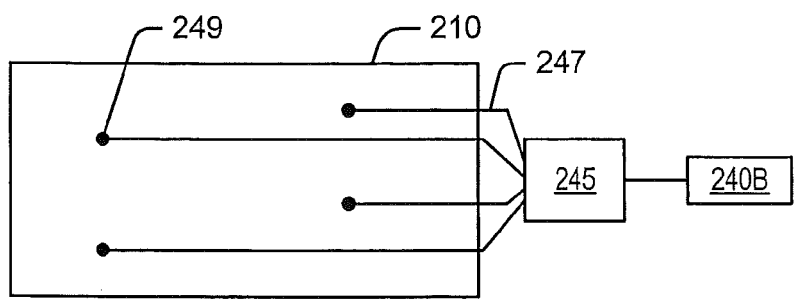

As shown in FIG. 9C, photosensors 240B may be arranged at one or more locations within a periphery of the light emitting region of the lighting panel 40. However in some embodiments, the photosensors 240B may be located away from the light emitting region of the lighting panel 40, and light from various locations within the light emitting region of the lighting panel 40 may be transmitted to the sensors 240B through one or more light guides. For example, as shown in FIG. 9D, light from one or more locations 249 within the light emitting region of the lighting panel 40 is transmitted away from the light emitting region via light guides 247, which may be optical fibers that may extend through and/or across the tiles 10. In the embodiments illustrated in FIG. 9D, the light guides 247 terminate at an optical switch 245, which selects a particular guide 247 to connect to the photosensor 240B based on control signals from the controller 230 and/or from the color management unit 260. It will be appreciated, however, that the optical switch 245 is optional, and that each of the light guides 245 may terminate at a photosensor 240B. In further embodiments, instead of an optical switch 245, the light guides 247 may terminate at a light combiner, which combines the light received over the light guides 247 and provides the combined light to a photosensor 240B. The light guides 247 may extend across partially across, and/or through the tiles 10. For example, in some embodiments, the light guides 247 may run behind the panel 40 to various light collection locations and then run through the panel at such locations. Furthermore, the photosensor 240B may be mounted on a front side of the panel 40 (i.e. on the side of the panel 40 on which the lighting devices 16 are mounted) or on a reverse side of the panel 40 and/or a tile 10 and/or bar assembly 30.

Figure 10:
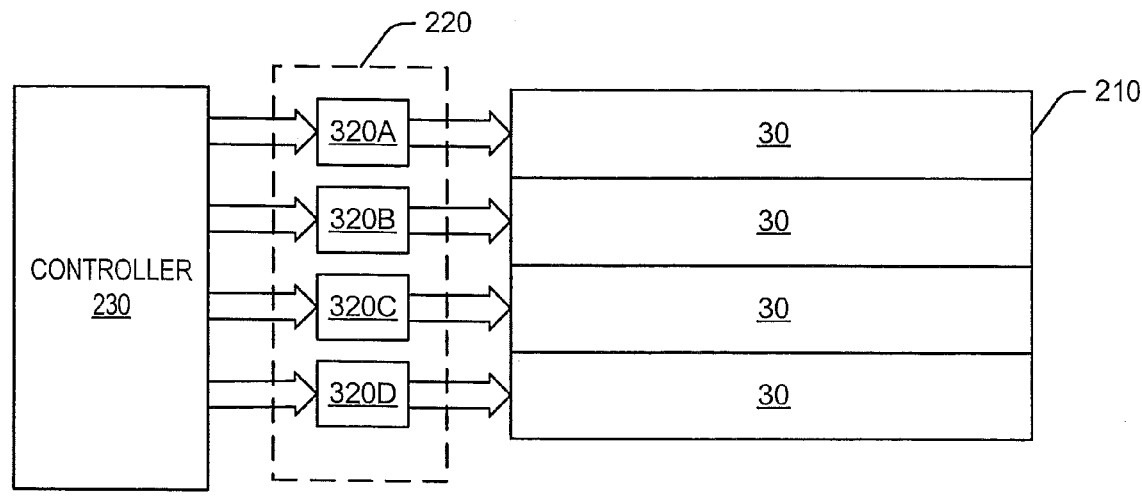
FIGS. 10-11 are schematic diagrams illustrating elements of a lighting panel system according to some embodiments of the invention.
Figure 11:
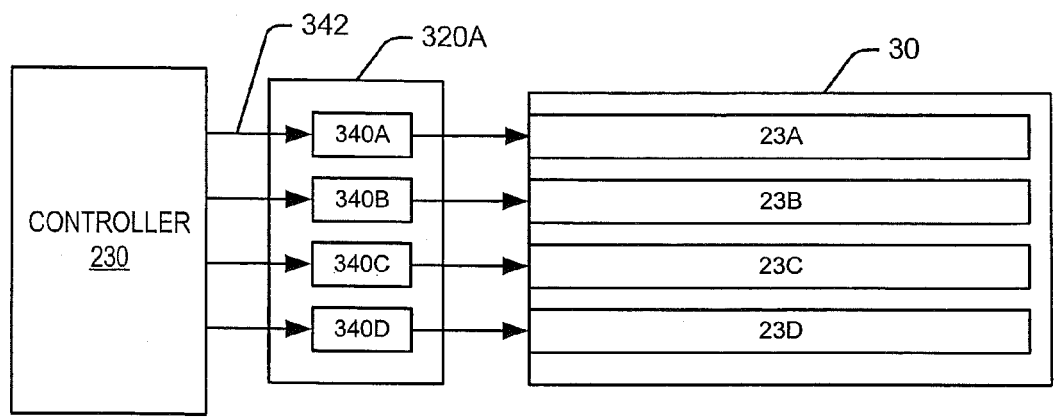

Referring now to FIG. 10, a current driver 220 may include a plurality of bar driver circuits 320A-320D. One bar driver circuit 320A-320D may be provided for each bar assembly 30 in a lighting panel 40. In the embodiments shown in FIG. 7, the lighting panel 40 includes four bar assemblies 30. However, in some embodiments the lighting panel 210 may include nine bar assemblies 30, in which case the current driver 220 may include nine bar driver circuits 320. As shown in FIG. 11, in some embodiments, each bar driver circuit 320 may include four current supply circuits 340A-340D, i.e., one current supply circuit 340A-340D for each LED string 23A-23D of the corresponding bar assembly 30. Operation of the current supply circuits 340A-340B may be controlled by control signals 342 from the controller 230.

Figure 12:
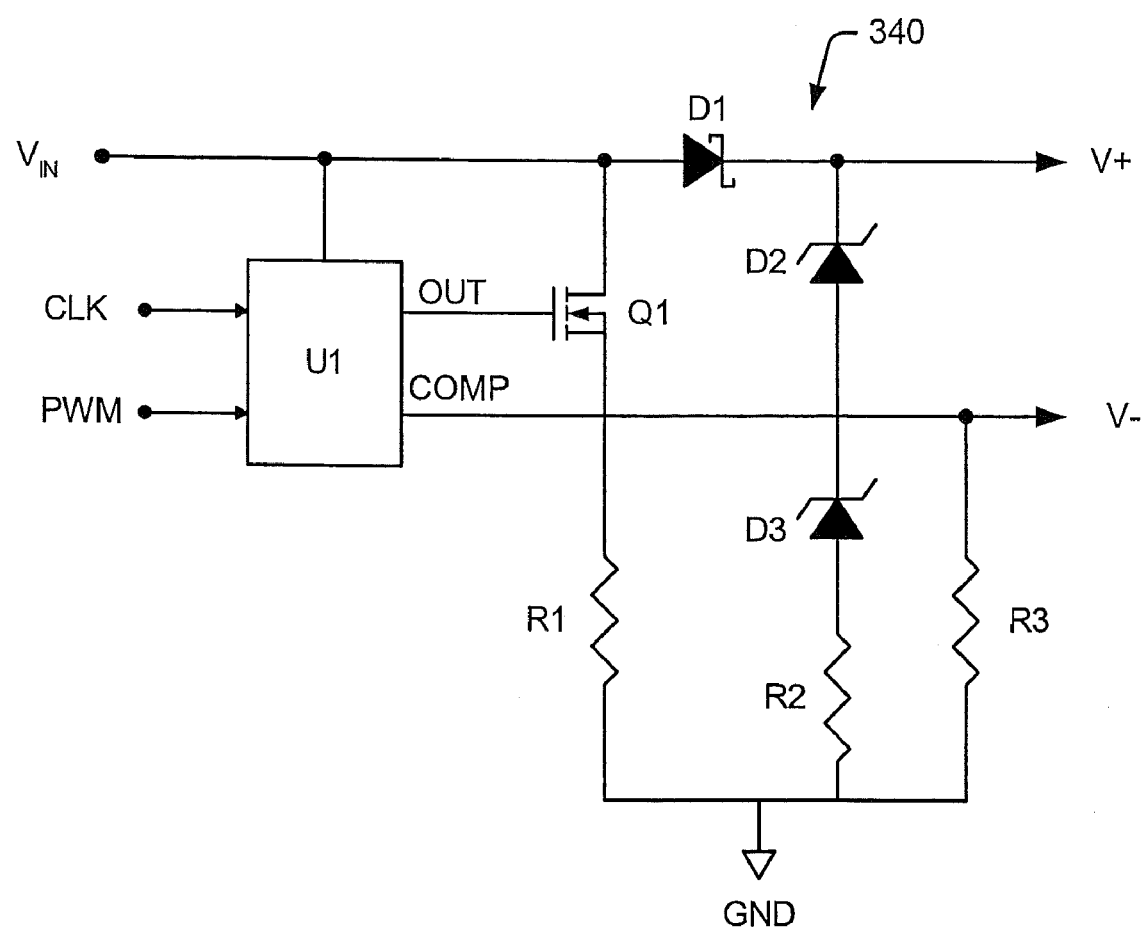
FIG. 12 is a schematic circuit diagram of a current supply circuit according to some embodiments of the invention.

A current supply circuit 340 according to some embodiments of the invention is illustrated in more detail in FIG. 12. As shown therein, a current supply circuit 340 may include a PWM controller U1, a transistor Q1, resistors R1-R3 and diodes D1-D3 arranged as shown in FIG. 12. The current supply circuit 340 receives an input voltage Vin. The current supply circuit 340 also receives a clock signal CLK and a pulse width modulation signal PWM from the controller 230. The current supply circuit 340 is configured to provide a substantially constant current to a corresponding LED string 23 via output terminals V+ and V−, which are connected to the anode and cathode of the corresponding LED string, respectively. The constant current may be supplied with a variable voltage boost to account for differences in average forward voltage from string to string. The PWM controller U1 may include, for example, an LM5020 Current Mode PWM controller from National Semiconductor Corporation.

The current supply circuit 340 is configured to supply current to the corresponding LED string 13 while the PWM input is a logic HIGH. Accordingly, for each timing loop, the PWM input of each current supply circuit 340 in the driver 220 is set to logic HIGH at the first clock cycle of the timing loop. The PWM input of a particular current supply circuit 340 is set to logic LOW, thereby turning off current to the corresponding LED string 23, when a counter in the controller 230 reaches the value stored in a register of the controller 230 corresponding to the LED string 23. Thus, while each LED string 23 in the lighting panel 40 may be turned on simultaneously, the strings may be turned off at different times during a given timing loop, which would give the LED strings different pulse widths within the timing loop. The apparent brightness of an LED string 23 may be approximately proportional to the duty cycle of the LED string 23, i.e., the fraction of the timing loop in which the LED string 23 is being supplied with current.

An LED string 23 may be supplied with a substantially constant current during the period in which it is turned on. By manipulating the pulse width of the current signal, the average current passing through the LED string 23 may be altered even while maintaining the on-state current at a substantially constant value. Thus, the dominant wavelength of the LEDs 16 in the LED string 23, which may vary with applied current, may remain substantially stable even though the average current passing through the LEDs 16 is being altered. Similarly, the luminous flux per unit power dissipated by the LED string 23 may remain more constant at various average current levels than, for example, if the average current of the LED string 23 was being manipulated using a variable current source.

The value stored in a register of the controller 230 corresponding to a particular LED string may be based on a value received from the color management unit 260 over the communication link 235. Alternatively and/or additionally, the register value may be based on a value and/or voltage level directly sampled by the controller 230 from a sensor 240.

In some embodiments, the color management unit 260 may provide a value corresponding to a duty cycle (i.e. a value from 0 to 100), which may be translated by the controller 230 into a register value based on the number of cycles in a timing loop. For example, the color management unit 260 indicates to the controller 230 via the communication link 235 that a particular LED string 23 should have a duty cycle of 50%. If a timing loop includes 10,000 clock cycles, then assuming the controller increments the counter with each clock cycle, the controller 230 may store a value of 5000 in the register corresponding to the LED string in question. Thus, in a particular timing loop, the counter is reset to zero at the beginning of the loop and the LED string 23 is turned on by sending an appropriate PWM signal to the current supply circuit 340 serving the LED string 23. When the counter has counted to a value of 5000, the PWM signal for the current supply circuit 340 is reset, turning the LED string off.

In some embodiments, the pulse repetition frequency (i.e. pulse repetition rate) of the PWM signal may be in excess of 60 Hz. In particular embodiments, the PWM period may be 5 ms or less, for an overall PWM pulse repetition frequency of 200 Hz or greater. A delay may be included in the loop, such that the counter may be incremented only 100 times in a single timing loop. Thus, the register value for a given LED string 23 may correspond directly to the duty cycle for the LED string 23. However, any suitable counting process may be used provided that the brightness of the LED string 23 is appropriately controlled.

The register values of the controller 230 may be updated from time to time to take into account changing sensor values. In some embodiments, updated register values may be obtained from the color management unit 260 multiple times per second.

Furthermore, the data read from the color management unit 260 by the controller 230 may be filtered to limit the amount of change that occurs in a given cycle. For example, when a changed value is read from the color management unit 260, an error value may be calculated and scaled to provide proportional control ("P"), as in a conventional PID (Proportional-Integral-Derivative) feedback controller. Further, the error signal may be scaled in an integral and/or derivative manner as in a PID feedback loop. Filtering and/or scaling of the changed values may be performed in the color management unit 260 and/or in the controller 230.

Figure 13:
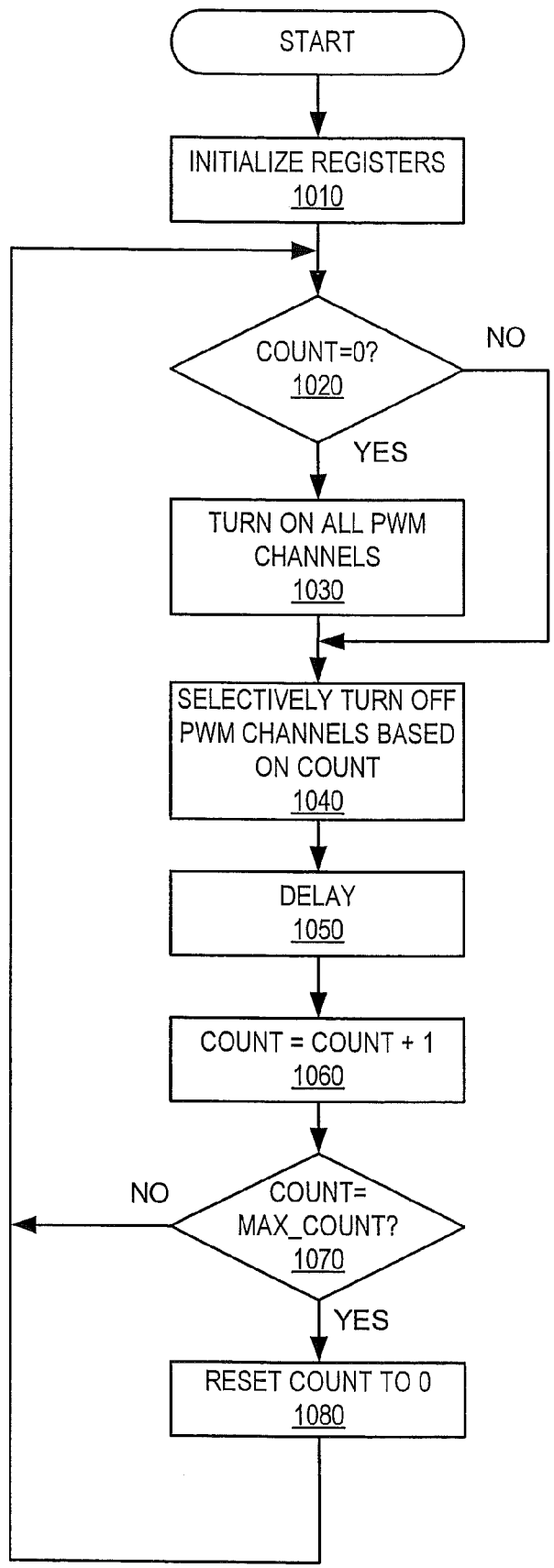
FIGS. 13-15 are flowchart diagrams illustrating operations according to some embodiments of the invention.
Figure 14:
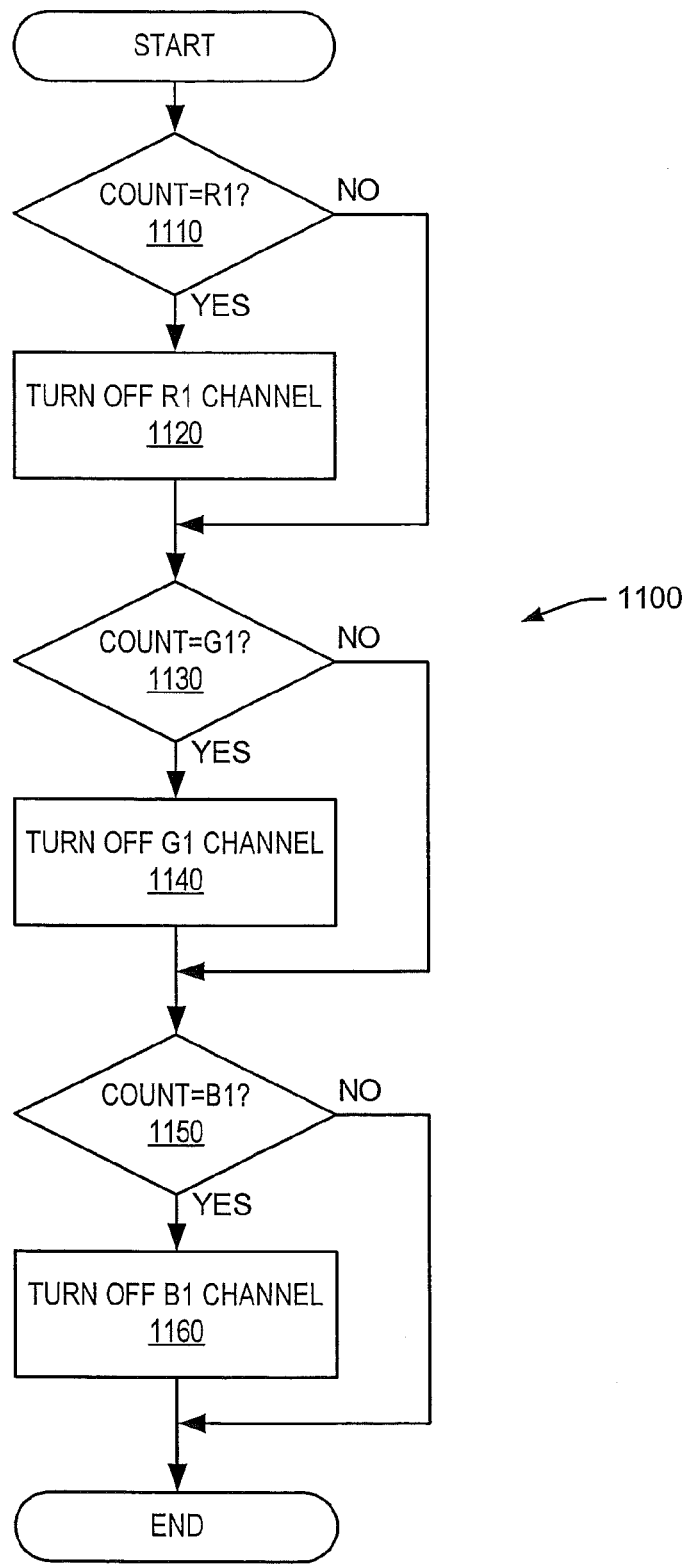
Figure 15:
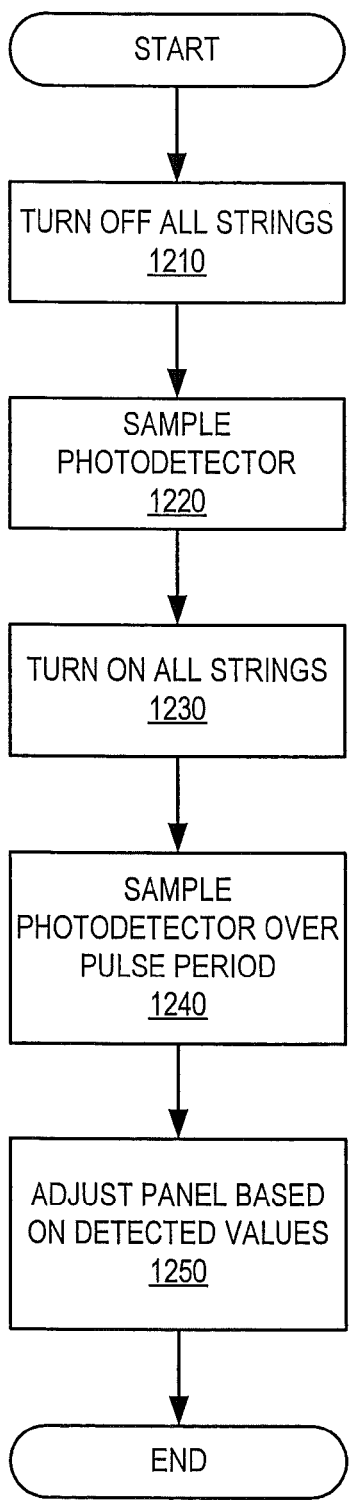

Operations of some elements of the luminaire 200 are illustrated in FIGS. 13-15. Referring to FIG. 13, the string registers in the controller 230 are initialized (block 1010). The initial register values may be stored in a non-volatile memory, such as a read-only memory (ROM), a non-volatile random access memory (NVRAM) or other storage device accessible by the controller 230. The counter COUNT in the controller 230 is also reset to zero.

Control then passes to block 1020, which determines if the counter COUNT is equal to zero. If so, the PWM outputs of each of the control lines 342 are set to logic HIGH (block 1030). If not, block 1030 is bypassed. The controller 230 then selectively turns off the PWM output of any LED string whose register value is equal to COUNT (block 1040). An optional delay is then introduced (block 1050), and the COUNT value is incremented (block 1060). Control then passes to block 1070, which determines if the COUNT has reached a maximum value, which in some embodiments may be 100. If not, control passes to block 1020. If the value of COUNT has reached the maximum value MAX_COUNT, the current timing loop has ended, and COUNT is reset to 0 (block 1080).

Referring now to FIG. 14, operations associated with selectively turning off the PWM signals for each of the LED strings 23 is illustrated as a process 1100, which is repeated for each group of red, green and blue strings 23 in a lighting panel 40. For example, the process 1100 may be repeated once for each bar assembly 30 of a lighting panel 40. As shown in FIG. 14, the controller 230 first determines if the count is equal to the register value of the red string register R1 (block 1110). If so, the PWM signal associated with the register R1 is set to logic low, thereby turning off the LED string 23 associated therewith (block 1120). Next, the controller 230 determines if the count is equal to the register value of the first green string register GIA (block 1130). If so, the PWM signal associated with the register GIA is set to logic low, thereby turning off the LED string or strings 23 associated therewith (block 1140). The same process may be repeated for the second green string register G1B. Alternatively, a single register may be used for both green strings. Finally, the controller 230 determines if the count is equal to the register value of the blue string register B1 (block 1150). If so, the PWM signal associated with the register B1 is set to logic low, thereby turning off the LED string 23 associated therewith (block 1160). The process 1100 is repeated for each bar assembly 30 in the lighting panel 40.

In some embodiments, the controller 230 may cause the color management unit 260 to sample a photosensor 240B when the lighting panel 40 is momentarily dark (i.e. when all of the light sources within the unit are momentarily switched off) in order to obtain a measure of ambient light (e.g. a dark signal value). The controller 230 may also cause the color management unit 260 to sample the photosensor 240B during a time interval in which the panel 40 is lighted for at least a portion of the interval in order to obtain a measure of the luminaire brightness (e.g. a light signal value). For example, the controller 230 may cause the color management unit 260 to obtain a value from the photosensor that represents an average over an entire timing loop.

For example, referring to FIG. 15, all LED strings in the lighting panel 40 are turned off (block 1210), and the photosensor 240B output is sampled to obtain a dark signal value (block 1220). The LED strings are then energized (block 1230), and the panel output is integrated over an entire pulse period and sampled (block 1240) to obtain a light signal value. The output of the lighting panel 40 is then adjusted based on the dark signal value and/or the light signal value (block 1250)

The brightness of the lighting panel 40 may be adjusted to account for differences in ambient light. For example, in situations in which the level of ambient light is high, the brightness of the lighting panel 40 may be reduced via a negative feedback signal in order to maintain a substantially consistent level of light in the area to be illuminated. In other situations in which the level of ambient light is low, the luminaire brightness may be increased by a positive feedback signal in order to maintain a consistent level of light in the illuminated area. That is, since the level of ambient light in an illuminated area may vary due, for example, to variations in the amount of natural light in the illuminated area. According to some embodiments of the invention, the light output from the luminaire 200 may be varied in response to a level of ambient light. For example, if the level of ambient light in an illuminated area is high, the brightness of the luminaire 200 may be reduced. In an area illuminated by a plurality of luminaires 200, it may be desirable to coordinate the measurement of ambient light among the luminaires 200.

As explained above, the brightness of the lighting panel 40 may be adjusted by adjusting the pulse widths of the current pulses for one or more (or all) of the LED strings 23 in the lighting panel 40. In some embodiments, the pulse widths may be adjusted based on a difference between the sensed luminaire brightness and the sensed ambient brightness. In other embodiments, the pulse widths may be adjusted based on a ratio of the sensed luminaire brightness (the light signal value) to the sensed ambient brightness (the dark signal value).

Accordingly, in some embodiments, the feedback loop formed by the lighting panel 40, the photosensor 240B, the color management unit 260 and the controller 230 may tend to maintain the average luminosity of the lighting panel 40 independent of ambient illumination. In other embodiments, the feedback loop may be configured to maintain a desired relationship between the average luminosity of the lighting panel 40 and the level of ambient illumination.

In some embodiments, the feedback loop may employ digital incremental logic. The digital incremental logic of the feedback loop may reference indices of a lookup table including a list of values such as duty cycle values.

As indicated above, in some embodiments of the invention, each of the PWM signals may be set to logic HIGH at the same time (i.e. at the beginning of a timing loop). In that case, all of the LEDs in the panel 40 will turn on at the same time within a given timing loop, but will turn off at different times depending on the register values associated with the various LED strings 23 in the lighting panel 40. However, in other embodiments, the turn-on of one or more of the LED strings 23 may be staggered, so that all of the LED strings 23 are not being turned on simultaneously. In some cases, the PWM signal of at least one of the LED strings 23 may be delayed by a fixed and/or variable delay that causes the LED string 23 to turn on at a different time from other LED strings 23. The delay may be provided in software, for example by providing an offset value that may be added to the register value. The offset value may be examined before the LED string is turned on.

Thus, for example, each LED string may have two associated values representing a start time and a stop time, or, alternatively, a start time and a duration. For example, the controller may maintain two values (START and STOP) for each LED string 23. At the entry of the timing loop, all PWM values may be reset to logic LOW. In each cycle of the timing loop, the value of COUNT is compared to START. If the value of COUNT is greater than or equal to START, but less than the value of STOP, the PWM signal for the LED string 23 is turned/maintained at logic HIGH. However, if the value of COUNT is greater than STOP, the PWM signal for the LED string is reset to logic LOW.

In some embodiments, the timing delay (e.g. the value of START) may be fixed at a different level for each LED string 23 and/or groups of LED strings 23. For example, timing delays may be set such that one red LED string 23A has a different START value than another red LED string 23A.

In further embodiments, a timing delay for each LED string may be randomly generated. The random timing delay may be generated for each timing loop and/or after a given number of timing loops have elapsed. A random delay may be provided within a minimum bound and a maximum bound. The minimum bound may be zero, and the maximum bound for a given LED string 23 may be the maximum count MAX_COUNT minus the string register value for the LED string 23 in question. For example, a pulse with a 60% duty cycle may be delayed by no more than 40% of the pulse period. This may ensure that the LED string 23 will remain on for the full pulse width, even if it is delayed.

By staggering the timing delays of the LED strings 23, in a fixed or random fashion, all of the LED strings 23 may not switched from an off-state to an on-state simultaneously, which may reduce flicker and/or combined amplitude in the light output from the lighting panel 40 and/or may balance an external power factor of the lighting panel 40.

Other methods may be employed in order to control the average luminosity of an LED string 23 and/or the lighting panel 40. For example, instead of using pulse width modulation, a system may employ pulse frequency modulation. Modifications to the controller 230 and/or current driver 220 in order to accommodate pulse frequency modulation are generally known to those skilled in the art.

Same colored LED strings in a lighting panel need not be driven with the same pulse width. For example, a backlight panel 40 may include a plurality of red LED strings 23, each of which may be driven with a different pulse width, resulting in a different average current level. Accordingly, some embodiments of the invention provide a closed loop digital control system for a lighting panel, such as an LCD backlight, that includes first and second LED strings 23 that include a plurality of LED chips 16 therein that emit narrow band optical radiation having a first dominant wavelength when energized, and third and fourth LED strings 23 that include a plurality of LED chips 16 that emit narrow band optical radiation having a second dominant wavelength, different from the first dominant wavelength.

In some embodiments, the first and second LED strings 23 are maintained at a different average current level than one another yet are driven at substantially the same on-state current. Likewise, the third and fourth LED strings are maintained at different average current levels than one another yet are driven at substantially the same on-state current.

The on-state current of the first and second LED strings 23 may be different than the on-state current of the third and fourth LED strings. For example, the on-state current used to drive red LED strings 23 may be different than the on-state current used to drive green and/or blue LED strings. The average current of a string 23 is proportional to the pulse width of the current through the string 23. The ratio of average current between the first and second LED strings 23 may be maintained relatively constant, and/or the ratio of average current between the third and fourth LED strings 23 may be maintained relatively constant. Furthermore, the ratio of average current between the first and second LED strings 23 compared to the average current of the third and fourth LED strings 23 may be allowed to change as part of the closed loop control in order to maintain a desired white point.

In some embodiments, the on-state current level provided to a given LED string 23 may be adjusted by the current supply circuit 340 in response to commands from the controller 230. In that case, a particular LED string may be driven at an on-state current level selected to adjust a dominant wavelength of a particular LED string 23. For example, due to chip-to-chip variations in dominant wavelength, a particular LED string 23 may have an average dominant wavelength that is higher than an average dominant wavelength of other LED strings 23 of the same color within a lighting panel 40. In that case, it may be possible to drive the higher-wavelength LED string at a slightly higher on-state current, which may cause the dominant wavelength of the LED string 23 to drop and better match that of the shorter-wavelength LED strings 23.

In some embodiments, the initial on-state drive currents of each of the LED strings 23 may be calibrated by a calibration process in which each of the LED strings is individually energized and the light output from each string is detected using the photosensor 240A. The dominant wavelength of each string may be measured, and an appropriate drive current may be calculated for each LED string in order to adjust the dominant wavelength as necessary. For example, the dominant wavelengths of each of the LED strings 23 of a particular color may be measured and the variance of the dominant wavelengths for a particular color may be calculated. If the variance of the dominant wavelengths for the color is greater than a predetermined threshold, or if the dominant wavelength of a particular LED string 23 is higher or lower than the average dominant wavelength of the LED strings 23 by a predetermined number of standard deviations, then the on-state drive current of one or more of the LED strings 23 may be adjusted in order to reduce the variance of dominant wavelengths. Other methods/algorithms may be used in order to correct/account for differences in dominant wavelength from string to string.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A lighting panel, comprising:
   at least one substrate having a first side parallel to a principal plane of the lighting panel;
   a plurality of solid state lighting devices arranged on the first side of the at least one substrate and configured to emit light;
   a reflector sheet on the first side of the at least one substrate;
   a brightness enhancement film on the reflector sheet, wherein the reflector sheet is arranged between the at least one substrate and the brightness enhancement film and the brightness enhancement film is configured to preferentially emit light having a first orientation from the lighting panel and to preferentially reflect light having a second orientation, different from the first orientation, back into the lighting panel; and
   a diffuser sheet between the reflector sheet and the brightness enhancement film, wherein the reflector sheet, the diffuser sheet and brightness enhancement film extend and are arranged parallel to the principal plane of the lighting panel.

2. The lighting panel of claim 1, wherein the reflector sheet is configured to reflect and disperse light incident thereon.

3. The lighting panel of claim 1, wherein the reflector sheet includes a plurality of apertures therethrough, wherein respective ones of the plurality of apertures aligned with corresponding ones of the plurality of solid state lighting devices.

4. The lighting panel of claim 1, wherein the reflector sheet comprises a plastic foam.

5. The lighting panel of claim 1, wherein the brightness enhancement film comprises a plurality of three dimensional light extraction features configured to bend at least some light rays passing through the brightness enhancement film toward the direction normal to the principal plane of the lighting panel.

6. The lighting panel of claim 1, further comprising a heatsink panel on a second side of the at least one substrate opposite to the first side and configured to draw heat away from the at least one substrate in a direction opposite to a direction of light emission from the at least one substrate.

7. The lighting panel of claim 1, wherein the diffuser sheet is in direct contact with the reflector sheet and the brightness enhancement film.

8. The lighting panel of claim 3, wherein respective ones of the apertures include angled sidewalls to thereby form reflective optical cavities around the corresponding ones of the plurality of solid state lighting devices.

9. The lighting panel of claim 5, wherein the light extraction features are random features.

10. The lighting panel of claim 5, wherein the brightness enhancement film is configured to limit direct emission from the lighting panel of light emitted by the plurality of solid state light emitting devices to thereby encourage light recycling/diffusion in the lighting panel.

11. The lighting panel of claim 5, wherein the light extraction features comprise fresnel-type lenses.

12. The lighting panel of claim 5, wherein the brightness enhancement film is configured to substantially collimate light emitted by the lighting panel.

13. The lighting panel of claim 6, wherein the heatsink panel comprises black anodized aluminum.

14. The lighting panel of claim 13, wherein the heatsink panel comprises a plurality of heatsink features configured to reduce a thermal resistance of the heatsink panel.

15. The lighting panel of claim 14, wherein the plurality of heatsink features comprise cooling fins.

16. The lighting panel of claim 14, wherein respective ones of the plurality of heatsink features are aligned with corresponding ones of the plurality of solid state light emitting devices.

17. A luminaire adapted for general illumination, the luminaire comprising:
   a lighting panel including at least one substrate, a plurality of solid state lighting devices electrically connected in a string and arranged on a first side of the at least one substrate that is parallel to a principal plane of the lighting panel and configured to emit light at a dominant wavelength, a reflector sheet on the first side of the at least one substrate, a brightness enhancement film on the reflector sheet, and a diffuser sheet between the reflector sheet and the brightness enhancement film, wherein the reflector sheet is arranged between the at least one substrate and the brightness enhancement film, and the reflector sheet, the diffuser sheet and brightness enhancement film extend and are arranged parallel to the principal plane of the lighting panel, wherein the brightness enhancement film is configured to preferentially emit light having a first orientation from the lighting panel and to preferentially reflect light having a second orientation, different from the first orientation, back into the lighting panel;

a current supply circuit configured to supply an on-state drive current to the string in response to a control signal;

a photosensor arranged to receive light from at least one of the plurality of solid state lighting devices; and a control system configured to receive an output signal from the photosensor and to adjust the control signal responsive to the output signal of the photosensor to thereby adjust an average current supplied to the string by the current supply circuit.

18. The luminaire of claim 17, wherein the current supply circuit comprises a closed loop variable voltage boost converter current source.

19. The luminaire of claim 17, wherein the control system is configured to sample the output of the photosensor when current is not being supplied to the string of solid state lighting devices to obtain an ambient light value.

20. The luminaire of claim 17, wherein the control system is configured to sample the photosensor during an interval in which current is being supplied to the string in order to obtain a brightness value.

21. The luminaire of claim 17, wherein the control signal comprises a pulse width modulation (PWM) signal, and wherein the control system is configured to control an average current supplied to the string by varying a duty cycle of the PWM signal.

22. The luminaire of claim 17, wherein the control system is configured to control an average current supplied to the string by varying a pulse frequency of the control signal.

23. The luminaire of claim 17, wherein the current supply circuit is configured to maintain the on-state current supplied to the string at a substantially constant value even as the average current supplied to the string is varied.

24. The luminaire of claim 17, wherein the control system comprises:

a color management unit coupled to the photosensor and configured to sample and process the output signal of the photosensor and to provide the processed output signal to the control system.

25. The luminaire of claim 17, further comprising:

a temperature sensor configured to sense a temperature associated with the lighting panel, wherein the control system is configured to adjust an average current supplied to the first string in response to a change in the sensed temperature.

26. The luminaire of claim 17, wherein the diffuser sheet is in direct contact with the reflector sheet and the brightness enhancement film.

27. The luminaire of claim 19, wherein the control system is configured to decrease average current to the string as the ambient light value increases.

28. The luminaire of claim 20, wherein the control system is configured to decrease the average current to the first string as the brightness value increases.

29. The luminaire of claim 28, wherein the control system is configured to adjust the average current supplied to the string based on the ambient light value and the brightness value.

30. The luminaire of claim 29, wherein the control system is configured to adjust the average current supplied to the string based on a difference between the ambient light value and the brightness value.

31. The luminaire of claim 29, wherein the control system is configured to adjust the average current supplied to the string based on a ratio of the ambient light value and the brightness value.

32. The luminaire of claim 29, wherein the control system is configured to maintain an average luminosity of the first string independent of an ambient/background illumination.

33. The luminaire of claim 29, wherein the control system is configured to maintain a relationship between an ambient/background illumination and an average luminosity of the string by providing a first feedback signal with respect to the ambient light value and a second feedback signal with respect to the brightness value.

* * * * *